US012695388B2

(12) United States Patent
Chiu et al.

(10) Patent No.: US 12,695,388 B2
(45) Date of Patent: Jul. 28, 2026

(54) RESONANT CONVERTER WITH DUAL-MODE CONTROL

(71) Applicant: SEMICONDUCTOR COMPONENTS INDUSTRIES, LLC, Scottsdale, AZ (US)

(72) Inventors: Chen-Hua Chiu, New Taipei City (TW); Sangcheol Moon, Bucheon-si (KR)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 378 days.

(21) Appl. No.: 18/481,779

(22) Filed: Oct. 5, 2023

(65) Prior Publication Data

US 2024/0048057 A1 Feb. 8, 2024

Related U.S. Application Data

(62) Division of application No. 17/191,073, filed on Mar. 3, 2021, now Pat. No. 11,799,382.

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0032* (2021.05); *H02M 1/0058* (2021.05);
(Continued)

(58) Field of Classification Search
CPC ........... H02M 3/33573; H02M 1/0058; H02M 1/083; H02M 1/0054; H02M 1/0032; H02M 3/01; Y02B 70/10
See application file for complete search history.

(56) References Cited

U.S. PATENT DOCUMENTS 4,855,888 A 8/1989 Henze et al.
4,967,332 A * 10/1990 Claydon ................. H02M 1/38
363/17

(Continued)

FOREIGN PATENT DOCUMENTS

EP 0625820 A2 11/1994

OTHER PUBLICATIONS

ON Semiconductor, "Current Mode Resonant Controller, with Integrated High-Voltage Drivers, High Performance," NCP1399 Series Data Sheet [Revised Oct. 2019].
(Continued)

*Primary Examiner* — Yusef A Ahmed
(74) *Attorney, Agent, or Firm* — Brake Hughes Bellermann LLP

(57) ABSTRACT

It may be desirable to limit the switching frequency of a pulse frequency modulated (PFM) resonant converter, however certain load conditions and/or startup condition require high switching frequencies to regulate an output voltage. The disclosed resonant converter can limit a maximum switching frequency while regulating an output voltage by shifting from PFM to phase-difference modulation based on a load condition. The appropriate modulation can be applied based on a comparison between a charge-control signal and a load-control signal.

11 Claims, 12 Drawing Sheets

(51) Int. Cl.
  *H02M 1/08* (2006.01)
  *H02M 3/00* (2006.01)
(52) U.S. Cl.
  CPC ............. *H02M 1/083* (2013.01); *H02M 3/01*
    (2021.05); *H02M 1/0054* (2021.05)

(56) References Cited

U.S. PATENT DOCUMENTS

| | | | | |
|---|---|---|---|---|
| 5,099,202 A * | 3/1992 | Claydon | ............. | H02M 3/3376 |
| | | | | 327/239 |
| 5,227,961 A * | 7/1993 | Claydon | ................. | H02M 1/38 |
| | | | | 327/269 |
| 5,291,384 A | 3/1994 | Mammano et al. | | |
| 6,016,052 A * | 1/2000 | Vaughn | .............. | H05B 41/2822 |
| | | | | 310/318 |
| 6,259,615 B1 * | 7/2001 | Lin | .................... | H02M 7/5387 |
| | | | | 315/225 |
| 6,396,715 B1 | 5/2002 | Zhang et al. | | |
| 10,193,455 B2 | 1/2019 | Moon et al. | | |
| 10,554,136 B1 | 2/2020 | Miletic | | |
| 11,038,430 B2 * | 6/2021 | Brennan | ........... | H02M 3/33573 |
| 2004/0160794 A1 * | 8/2004 | Lin | .................... | H02M 7/5387 |
| | | | | 363/98 |
| 2005/0174818 A1 * | 8/2005 | Lin | .................... | H05B 41/2855 |
| | | | | 363/98 |
| 2006/0077700 A1 * | 4/2006 | Lin | .................... | H05B 41/2855 |
| | | | | 363/98 |
| 2006/0215424 A1 | 9/2006 | Aso et al. | | |
| 2008/0247194 A1 * | 10/2008 | Ying | .................... | H02M 3/3376 |
| | | | | 363/21.02 |
| 2009/0129125 A1 * | 5/2009 | Yang | ................. | H02M 3/33592 |
| | | | | 363/21.14 |
| 2009/0135631 A1 * | 5/2009 | Yang | ................. | H02M 3/33592 |
| | | | | 363/89 |
| 2011/0103097 A1 * | 5/2011 | Wang | ................. | H02M 3/33592 |
| | | | | 363/21.02 |
| 2011/0128758 A1 | 6/2011 | Ueno et al. | | |
| 2011/0176335 A1 | 7/2011 | Li et al. | | |
| 2011/0299301 A1 | 12/2011 | Huang | | |
| 2012/0229034 A1 * | 9/2012 | Yu | ...................... | H05B 45/3725 |
| | | | | 315/186 |
| 2013/0010503 A1 | 1/2013 | Choi | | |
| 2013/0257301 A1 | 10/2013 | Tran et al. | | |
| 2014/0355313 A1 | 12/2014 | Nishikawa | | |
| 2015/0009717 A1 * | 1/2015 | Chen | .................. | H02M 3/3376 |
| | | | | 363/21.02 |
| 2015/0084428 A1 | 3/2015 | Moon et al. | | |
| 2015/0109827 A1 | 4/2015 | Poshtkouhi et al. | | |
| 2015/0138841 A1 | 5/2015 | Pahlevaninezhad et al. | | |
| 2015/0155788 A1 | 6/2015 | Wagner | | |
| 2015/0180345 A1 * | 6/2015 | Frost | .................. | H02M 3/3376 |
| | | | | 363/21.02 |
| 2015/0222193 A1 | 8/2015 | Zambetti et al. | | |
| 2015/0229225 A1 * | 8/2015 | Jang | ...................... | H02M 3/285 |
| | | | | 363/17 |
| 2015/0333634 A1 * | 11/2015 | Yoshida | .............. | H02M 3/3353 |
| | | | | 363/21.03 |
| 2015/0365005 A1 * | 12/2015 | Panov | ............... | H02M 3/33584 |
| | | | | 307/24 |
| 2016/0087543 A1 | 3/2016 | Jin et al. | | |
| 2016/0111964 A1 | 4/2016 | Oki et al. | | |
| 2016/0190940 A1 | 6/2016 | Yan et al. | | |
| 2016/0248332 A1 * | 8/2016 | Ohtake | ............. | H02M 3/33546 |
| 2016/0365804 A1 | 12/2016 | Nakagawa et al. | | |
| 2017/0093296 A1 * | 3/2017 | Chen | ..................... | H02M 1/088 |
| 2017/0110973 A1 * | 4/2017 | Chen | ......................... | H03L 7/00 |
| 2017/0223792 A1 * | 8/2017 | Elferich | ............. | H02M 1/4241 |
| 2018/0054111 A1 | 2/2018 | Moon et al. | | |
| 2018/0054130 A1 * | 2/2018 | Moon | ............... | H02M 3/33515 |
| 2018/0054133 A1 * | 2/2018 | Moon | .................... | H02M 1/36 |
| 2018/0054134 A1 * | 2/2018 | Moon | .................... | H02M 1/08 |
| 2018/0076723 A1 * | 3/2018 | Li | ........................ | H02M 3/3378 |
| 2018/0278167 A1 | 9/2018 | Deboy et al. | | |
| 2018/0301995 A1 * | 10/2018 | Chang | ..................... | H02M 3/01 |
| 2018/0302000 A1 | 10/2018 | Moon et al. | | |
| 2018/0309373 A1 * | 10/2018 | Chang | ..................... | H02M 3/01 |
| 2019/0044430 A1 * | 2/2019 | Moon | ................. | H02M 3/3376 |
| 2019/0068071 A1 * | 2/2019 | Jia | ......................... | H02M 3/3376 |
| 2019/0157860 A1 | 5/2019 | Duvnjak | | |
| 2019/0200441 A1 | 6/2019 | Zhu et al. | | |
| 2019/0260232 A1 | 8/2019 | Liu et al. | | |
| 2019/0326758 A1 | 10/2019 | Zhu et al. | | |
| 2020/0007043 A1 * | 1/2020 | Miao | ....................... | H02M 3/01 |
| 2020/0112244 A1 | 4/2020 | Chen et al. | | |
| 2020/0169176 A1 * | 5/2020 | Murata | ................... | H02M 3/01 |
| 2020/0195124 A1 | 6/2020 | Mayell et al. | | |
| 2020/0195144 A1 * | 6/2020 | Gekinozu | ............... | H02M 3/01 |
| 2020/0195149 A1 | 6/2020 | Mayell et al. | | |
| 2020/0195154 A1 | 6/2020 | Mayell et al. | | |
| 2020/0195161 A1 | 6/2020 | Mayell et al. | | |
| 2020/0287468 A1 * | 9/2020 | Mizutani | .......... | H02M 7/53871 |
| 2020/0350815 A1 * | 11/2020 | Wei | ........................ | H02M 1/083 |
| 2021/0028712 A1 * | 1/2021 | Yu | .......................... | H01F 30/16 |
| 2021/0036612 A1 * | 2/2021 | Deng | ................. | H02M 7/1557 |
| 2021/0067045 A1 * | 3/2021 | Zhang | .............. | H02M 3/33573 |
| 2021/0070185 A1 * | 3/2021 | Liu | ......................... | B60L 53/51 |
| 2021/0111620 A1 * | 4/2021 | Jin | ......................... | H02M 3/01 |
| 2021/0135666 A1 | 5/2021 | Wang et al. | | |
| 2021/0194377 A1 * | 6/2021 | Deng | ................. | H02M 1/4241 |
| 2021/0203236 A1 * | 7/2021 | Zhang | .............. | H02M 3/33561 |
| 2021/0384840 A1 | 12/2021 | Kumar et al. | | |
| 2022/0103080 A1 * | 3/2022 | Yang | ............... | H02M 1/0009 |
| 2022/0166327 A1 * | 5/2022 | Liu | .................... | H02M 1/0025 |
| 2022/0182024 A1 | 6/2022 | Nguyen et al. | | |
| 2022/0321016 A1 | 10/2022 | Khaligh et al. | | |
| 2022/0337166 A1 * | 10/2022 | Chan | .................. | H02M 1/007 |
| 2023/0022357 A1 * | 1/2023 | Chen | .................. | H02M 1/0009 |
| 2023/0088584 A1 * | 3/2023 | Panov | ................ | H02M 1/0009 |
| | | | | 323/271 |
| 2023/0238831 A1 * | 7/2023 | Choi | ........................ | H02J 50/10 |
| | | | | 307/104 |

OTHER PUBLICATIONS

Fairchild Semiconductor, "Advanced Secondary Side LLC Resonant Converter Controller with Synchronous Rectifier Control," FAN7688 Data Sheet [Revised Nov. 2015].
Yudi, M. Xingkui, Z. Zhe and Y. Shi, "New hybrid control for wide input full-bridge LLC resonant DC/DC converter," 2018 3rd International Conference on Intelligent Green Building and Smart Grid (IGBSG), Yi-Lan, 2018, pp. 1-4.
B. McDonald and F. Wang, "LLC performance enhancements with frequency and phase shift modulation control," 2014 IEEE Applied Power Electronics Conference and Exposition—APEC 2014, Fort Worth, TX, 2014, pp. 2036-2040, doi: 10.1109/APEC.2014. 6803586.

\* cited by examiner

RESONANT CONVERTER WITH DUAL-MODE CONTROL

CLAIM OF PRIORITY

The present application is a divisional application of, and claims priority to, U.S. patent application Ser. No. 17/191,073, filed on Mar. 3, 2021, the disclosure of which is herein incorporated by reference in its entirety.

FIELD OF THE DISCLOSURE

The present disclosure relates to resonant converter circuits and more specifically to an LLC resonant converter circuit for converting a first direct current (DC) voltage at an input to a second DC voltage at an output.

BACKGROUND

Converter circuits are common in applications in which a high voltage (HV) must be converted to a low voltage (LV), or vice versa. A resonant converter is a type of converter circuit configured to convert an input DC voltage to an output DC voltage in stages. First, the input DC voltage is converted to a square wave at a switching frequency by a square wave generator. For example, the square wave generator may include a switching network, that when toggled at the switching frequency can alternatively couple its output between the input DC voltage and a ground to generate a square wave. Next, the resulting square wave is applied to a resonant network. The resonant network is configured to filter the square wave in order to generate an alternating current (AC) signal. Finally, the generated AC signal is applied to a rectifier network that is configured to rectify and filter the AC signal in order to generate an output DC voltage.

A variable load coupled to the resonant converter may affect the output DC voltage. For example, in a heavy load condition, an effective resistance of the load may be reduced, thereby reducing the output DC voltage, and vice versa for a light load condition. In order to maintain (i.e., regulate) the output DC voltage for variations in load conditions, the resonant converter circuit includes a switching controller configured to counter changes in the output DC voltage. For example, the switching controller may be configured to change the switching frequency applied to the square wave generator in response to changes in the load condition in order to maintain (i.e., regulate) the output DC voltage. Changes to the switching frequency, however, may have unwanted effects in some circumstances.

SUMMARY

In at least one aspect, the present disclosure generally describes a resonant converter. The resonant converter includes a switching network that is configurable by switching signals into states that correspond to either pulse frequency modulation or phase-difference modulation. The resonant converter further includes a switching controller that is configured to generate the switching signals corresponding to PFM or phase-difference modulation based on a load condition and a target switching frequency (e.g., maximum switching frequency). The load condition can be determined based on a comparison of a charge-control signal and a load-control signal.

In another aspect, the present disclosure generally describes a method for controlling switching of a full bridge switching network of a resonant converter. The method includes assessing a charge-control signal criterion and changing states of first totem pole switching signals for the full bridge switching network when the charge-control signal criterion is satisfied. The method further includes assessing the charge-control signal criterion and a first clock-timer signal criterion and maintaining states of second totem pole switching signals for the full bridge switching network until both the charge-control signal criterion and the first clock-timer signal criterion are satisfied.

In a possible implementation of the method, maintaining states of the second totem pole switching signals of the full bridge switching network until both the charge-control signal criterion and the first clock-timer signal criterion are satisfied results in (i) a phase difference (i.e., phase shift) between the first totem pole switching signals and the second totem pole switching signals when the charge control signal criterion is satisfied before the first clock-time signal criterion is satisfied and (ii) no phase difference (i.e., zero phase shift) between the first totem pole switching signals and the second totem pole switching signals when the charge-control signal criterion is satisfied after the first clock-timer signal criterion is satisfied.

In another aspect, the present disclosure generally describes a resonant converter. The resonant converter includes a switching network that is configured to receive an input DC voltage at an input to the resonant converter and to output a drive signal that is modulated according to switching signals. The resonant converter further includes a resonant network that is configured to receive the drive signal and to output a filtered drive signal. The resonant converter further includes a rectifier network that is configured to receive the filtered drive signal from the resonant network and to generate an output DC voltage at an output of the resonant converter. The resonant converter further includes a switching controller that is configured to receive a charge-control signal as feedback from the resonant network and a load-control signal as feedback from the output of the resonant converter. Based on the charge-control signal and the load-control signal, the switching controller is configured to generate switching signals to modulate the drive signal. The drive signal is modulated according to pulse frequency modulation (PFM) or phase-difference modulation based on a comparison between the charge-control signal and the load-control signal.

In a possible implementation of the resonant converter, the resonant network is a series inductor-inductor-capacitor (LLC) circuit and the charge-control signal is an integration of a current in the LLC circuit.

In another possible implementation of the resonant converter, the switching network is a full bridge switching network that includes a first totem pole circuit and a second totem pole circuit. The first totem pole circuit and the second totem pole circuit are configurable in four possible states. When modulated using pulse frequency modulation, the switching network is toggled between two of the four possible states, and when modulated using phase-difference modulation, the switching network is cycled through all four possible states.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A gain (i.e., $V_{OUT}/V_{IN}$) of a resonant converter circuit (i.e., resonant converter) can be controlled according to a switching frequency. It may be desirable to operate the resonant converter at switching frequencies above a resonance ($f_0$) of the resonant converter (i.e., high switching frequency operation). For example, high switching frequency operation may extend a usable range (e.g., $V_{IN}$ range) of the resonant converter. Additionally, high switching frequency operation can help to slowly activate the resonant converter at startup to prevent transient (e.g., current in-rush) responses. High switching frequency operation has drawbacks, however. For example, the resonant converter operates less efficiently at high switching frequencies. For some applications, the losses at the high switching frequencies may be too high. The present disclosure describes a resonant converter having a control configured to clamp a switching frequency (e.g., maximum switching frequency) without losing regulation of the output even as a load condition is changed.

Figure 1:
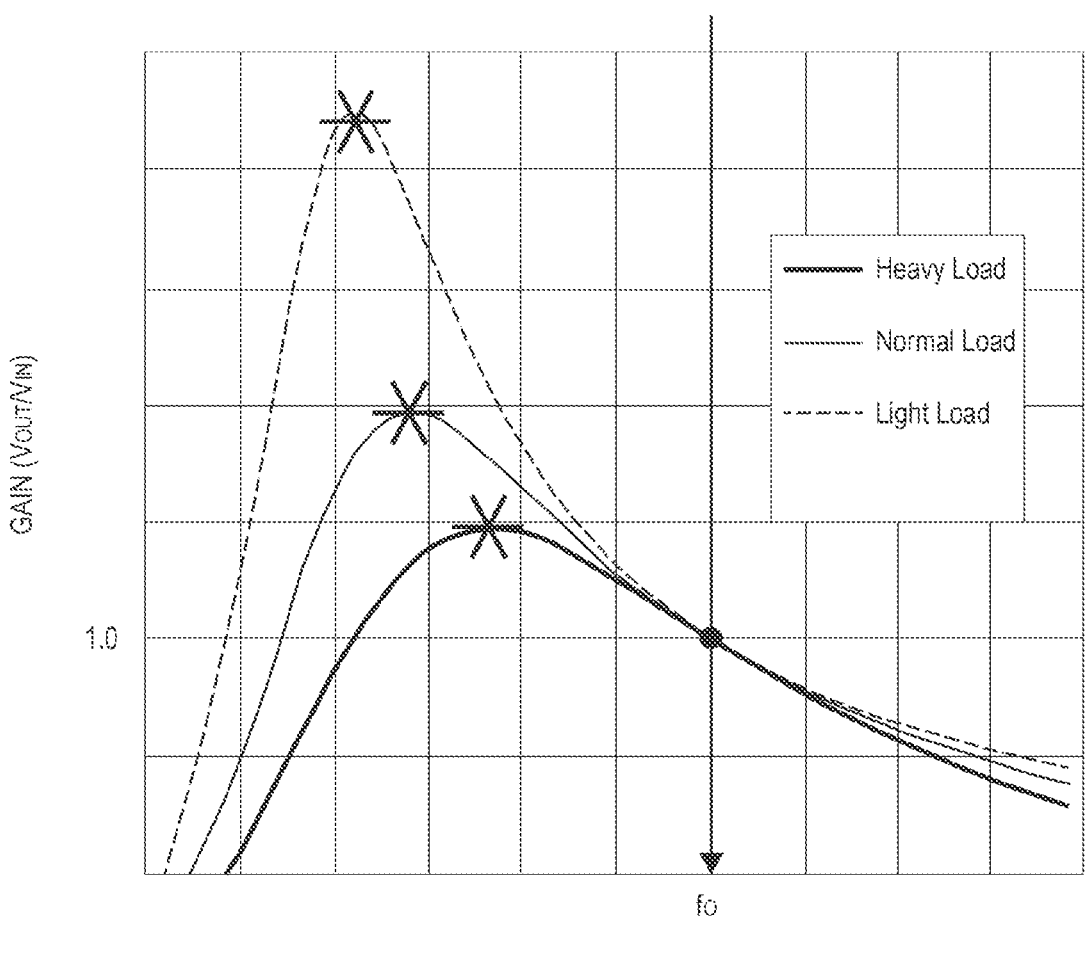
FIG. 1 is a plot of gain curves for a resonant converter under different load conditions.

FIG. 1 illustrates graphs of a gain versus switching frequency for a resonant converter under various load conditions (e.g., light load, normal load, heavy load). The curves are shaped based on a response of a resonant network of the resonant converter to a switching frequency. When the switching frequency is at a resonant frequency ($f_o$), frequency of the resonant network, variations due to load changes may be minimized. It may be desirable, however, to use switching frequencies higher than the resonant frequency ($f_o$) in order to allow gain values that are less than 1. In other words, an allowable gain range may be increased by operating the resonant converter at switching frequencies above the resonant frequency ($f_o$). While this operation can allow for more input voltage ($V_{IN}$) variation, the frequency variation at a given gain for different load conditions can be large. For example, a light load condition may require a higher switching frequency for a given gain than a heavy load condition. In other words, when operating at switching frequencies above the resonant frequency, as a load condition gets lighter the switching frequency may be set higher to maintain the gain. A range of load conditions can be limited by negative effects (e.g., losses) associated with operating at high frequencies. The disclosed resonant converter can provide a large gain range without the limitation on load condition variation caused by the negative effects of high frequency operation.

The output DC voltage ($V_{OUT}$) of the disclosed resonant converter can be controlled using different control modes. A first control mode of the resonant converter can be pulse-frequency modulation (PFM) in which the switching frequency can be adjusted to adjust the gain of the resonant converter (e.g., in response to a load change). For example, if a load on the resonant converter suddenly drops (e.g., to a light load condition), the output voltage may be increased. In response, the controller, using PFM, increases the switching frequency of the converter to reduce the gain by an amount that compensates for the load-change increase. The increase of the switching frequency, using PFM, can proceed until it reaches a target switching frequency (e.g., a maximum switching frequency) of the disclosed resonant converter. If additional reductions in the output voltage are required, the control of the resonant converter may automatically shift to a second control mode. The second control mode of the resonant converter can be a phase-difference modulation in which a phase-difference between switching signals can be adjusted to adjust a gain of the resonant converter (e.g., in response to a load change). The switching frequency may not be changed when performing phase-difference modulation. As a result, control may be continued without increasing the switching frequency past the maximum switching frequency.

Control of the disclosed resonant converter can automatically shift between PFM (i.e., first control mode) and phase-difference modulation (i.e., second control mode) to maintain the regulation of the output without exceeding the maximum switching frequency. This approach has some advantages. By clamping (i.e., limiting) the maximum switching frequency, a zero-voltage switching (ZVS) can be maintained in the switching network of the resonant converter. Additionally, both modes of regulation (i.e., PFM, phase-difference modulation) can have the improved loop-response (e.g., faster transient response) associated with charge control feedback. The disclosed resonant converter and methods for control may also offer opportunities for various applications. For example, the approach may be used in a soft start of the resonant converter in which the output voltage is slowly increased to its final value.

Figure 2:
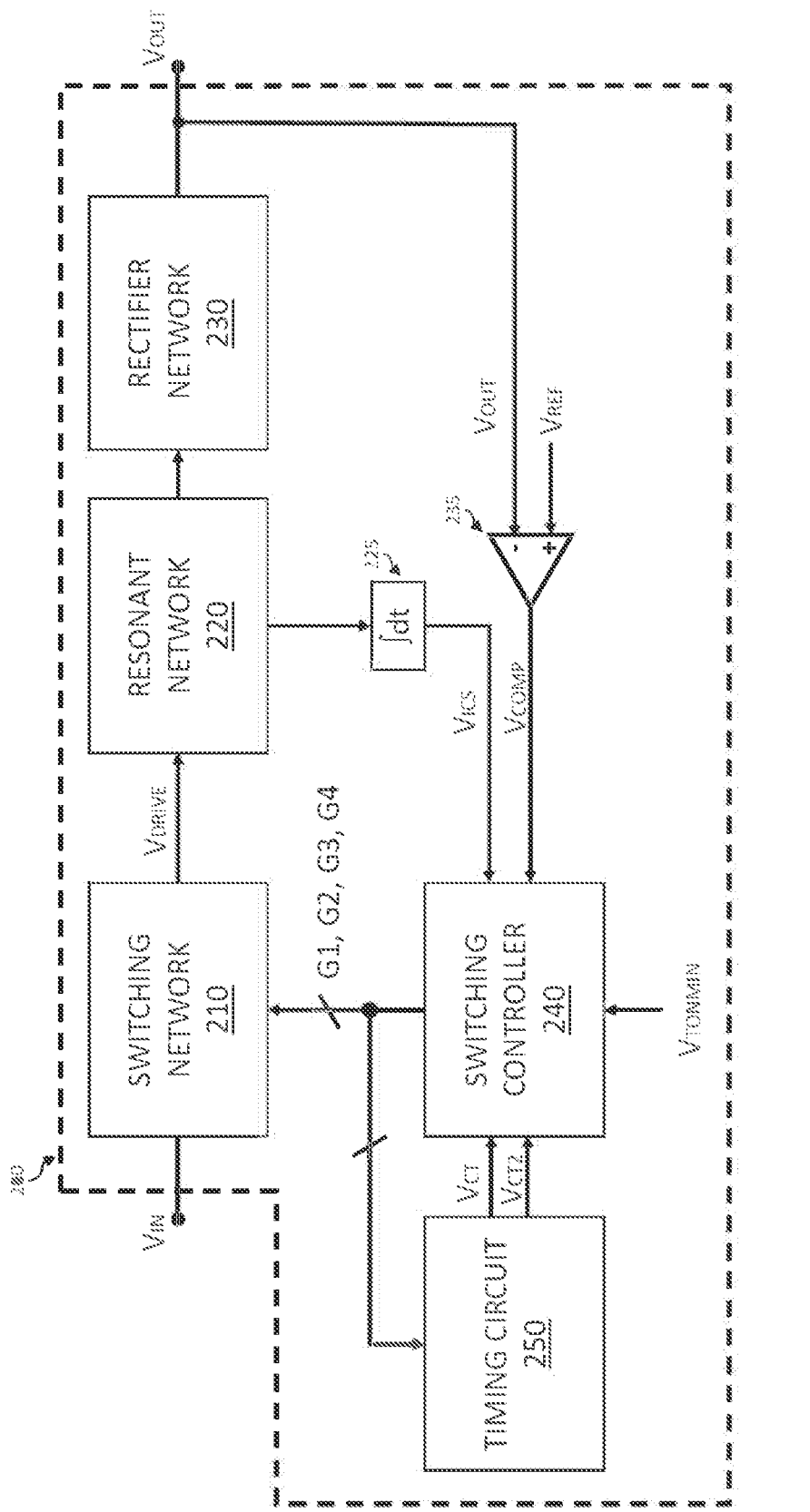
FIG. 2 is a block diagram of a resonant converter according to a possible implementation of the present disclosure.

FIG. 2 is a block diagram of a resonant converter according to a possible implementation of the present disclosure. The resonant converter circuit (i.e., resonant converter 200) includes a switching network 210. The switching network 210 is configured to receive a DC input signal ($V_{IN}$) and to generate (i.e. output) a drive signal ($V_{DRIVE}$) that varies according to multiple possible levels. The switching network may include switching devices (e.g., transistors) that are controlled ON/OFF by switching signals (G1, G2, G3, G4) (i.e., gate signals) to produce the drive signal ($V_{DRIVE}$).

Losses in the switching devices may be increased as the switching frequency is increased. In some applications, these losses can limit a range over which the switching frequency can be changed, which can limit a range that the output DC voltage can be regulated.

Figure 3:
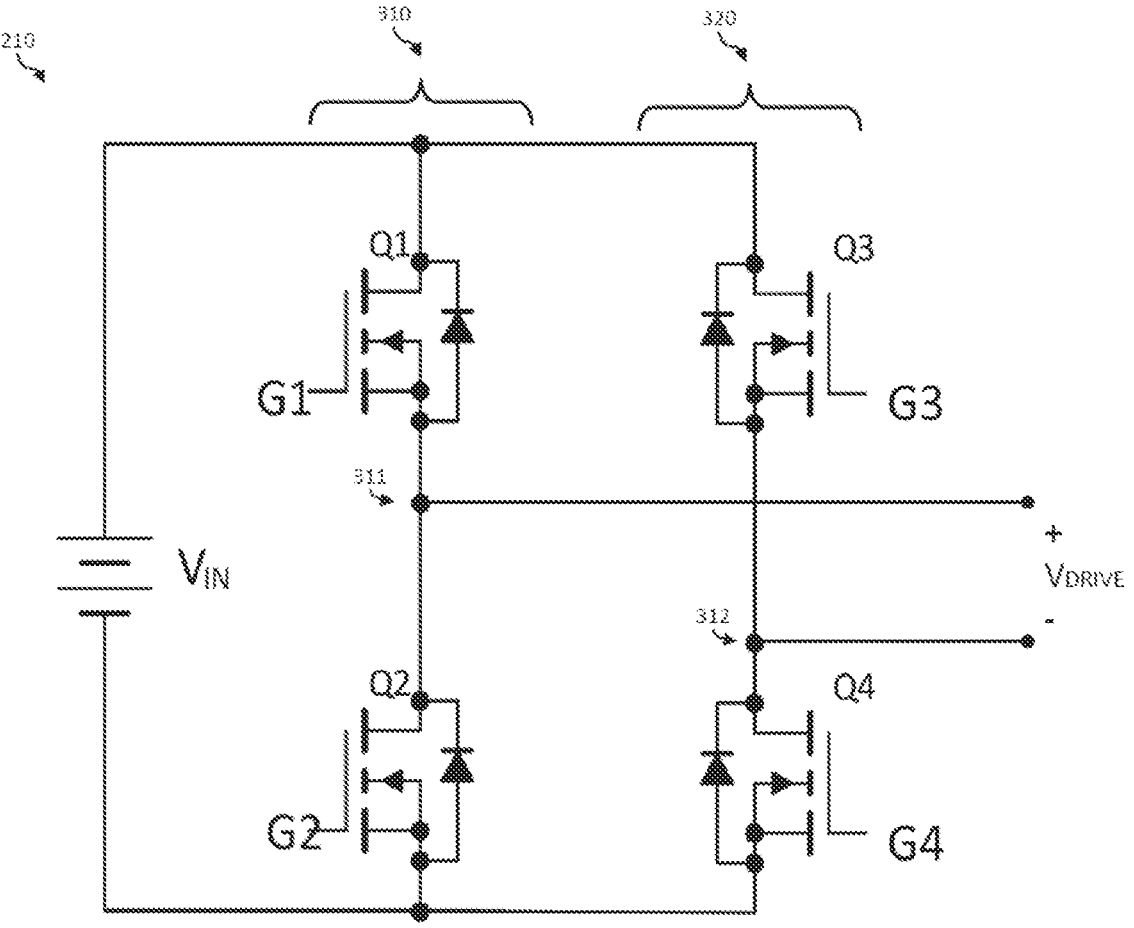
FIG. 3 is a schematic of a switching network for the resonant converter of FIG. 2 according to a possible implementation of the present disclosure.

FIG. 3 is a schematic of a switching network according to an implementation of the present disclosure. The switching network 210 includes four transistors (Q1, Q2, Q3, Q4). A first pair of transistors (Q1, Q2) form a first totem pole circuit 310 between the input voltage ($V_{IN}$) and a ground, while a second pair of transistors (Q3, Q4) form a second totem pole circuit 320 between the input voltage and ground. The output of the switching network 210 is between a first center node 311 of the first totem pole circuit 310 and a second center node 312 of the second totem pole circuit 320. The transistors in each totem pole circuit can configure the transistors in complementary ON (conducting) and OFF (not conducting) conditions. In other words, for the first totem pole circuit Q1 is ON (i.e., G1 is HIGH) while Q2 is OFF (i.e., G2 is LOW), and vice versa. For the second totem pole circuit Q3 is ON (i.e., G3 is HIGH) while Q4 is OFF (i.e., G4 is LOW), and vice versa.

The ON/OFF combinations of the transistors may provide multiple outputs ranging between positive and negative voltages. Accordingly, the switching network 210 is a full-bridge switching network, and a resonant converter with a full-bridge switching network is known as a full-bridge resonant converter. The outputs ($V_{DRIVE}$) of the (full-bridge) switching network for various possible switch states are shown in TABLE 1 below.

TABLE 1

| POSSIBLE STATES OF THE SWITCHING NETWORK | | | | |
|---|---|---|---|---|
| $V_{DRIVE}$ | $Q_1$ | $Q_2$ | $Q_3$ | $Q_4$ |
| $V_{IN}$ | ON | OFF | OFF | ON |
| 0 | ON | OFF | ON | OFF |
| $-V_{IN}$ | OFF | ON | ON | OFF |
| 0 | OFF | ON | OFF | ON |

Figure 4:
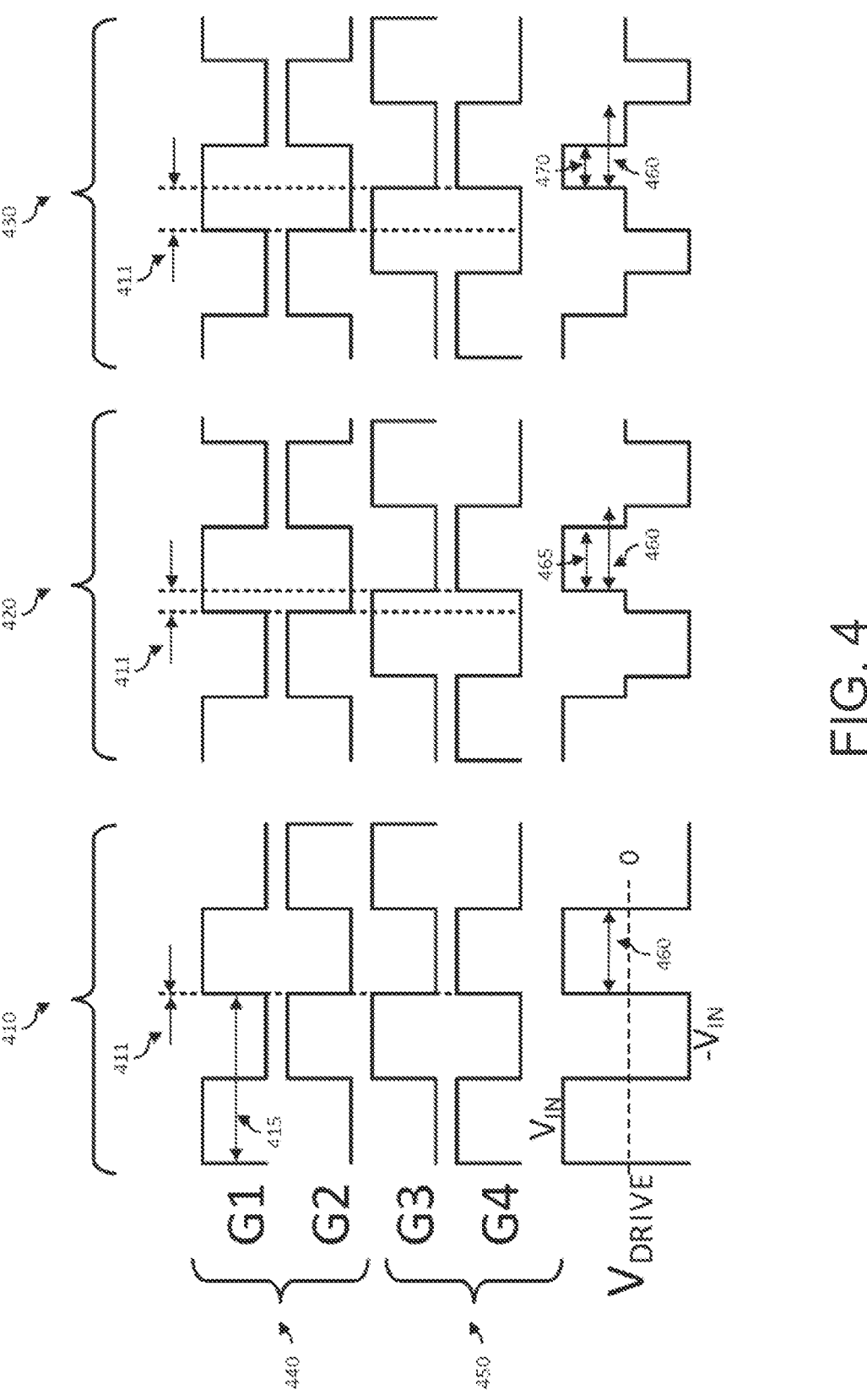
FIG. 4 are plots of switching signals for the switching network of FIG. 3 illustrating various applied phase modulation conditions.

FIG. 4 are graphs illustrating possible switching signals for the full-bridge switching network of FIG. 3. The first totem pole switching signals 440 are G1 and G2. G1 is HIGH while G2 is LOW, and vice versa. The second totem pole switching signals 450 are G3 and G4. G3 is LOW while G4 is HIGH, and vice versa.

In a first switching scenario 410, the first totem pole switching signals 440 (i.e., G1, G2) and the second totem pole switching signals 450 (i.e., G3, G4) alternate at a switching frequency having a period 415 (e.g., minimum period). The first totem pole switching signals 440 are complementary with the second totem pole switching signals 450 so that when G1 is HIGH then G3 is LOW, when G1 is LOW then G3 is HIGH, when G2 is LOW then G4 is HIGH, and when G2 is HIGH then G4 is LOW. The first totem pole switching signals and the second totem pole switching signals transition (e.g., HIGH/LOW, LOW/HIGH) at the same times. In other words, a phase difference 411 (i.e., phase shift) between the first totem pole switching signals 440 and the second totem pole switching signals 450 is zero. When the phase difference 411 of the switching signals is zero, the switching network is configured to toggle the output ($V_{DRIVE}$) between $V_{IN}$ and $-V_{IN}$. In the first switching scenario 410, $V_{DRIVE}$ is not zero, and the switching network 210 is configured to conduct power to the resonant network 220 over a first power injection period 460.

In a second switching scenario 420, the first totem pole switching signals 440 (G1, G2) and the second totem pole switching signals 450 (G3, G4) alternate at the switching frequency of the first switching scenario but have a phase difference 411 that is non-zero. The (non-zero) phase difference 411 creates a first overlap period in which G1 turns HIGH before G3 turns LOW. In this first overlap period, the output of the switching network 210 is shorted (i.e., $V_{DRIVE}$=0) because Q1 and Q3 are both ON. The first overlap period continues until G3 turns LOW and G4 turns HIGH. After the first overlap period, G1 and G4 are HIGH, G2 and G3 are LOW, and the switching network 210 is configured to output $V_{IN}$ (i.e., $V_{DRIVE}=V_{IN}$). In this configuration, the switching network is configured to deliver energy to the resonant network. The phase difference 411 creates a second overlap period in which G2 turns HIGH before G4 turns LOW. In this second overlap period, the output of the switching network 210 is shorted (i.e., $V_{DRIVE}$=0) because Q2 and Q4 are both ON. In the second switching scenario, the drive signal ($V_{DRIVE}$) is three levels ($-V_{IN}$, 0, $+V_{IN}$). Power is not delivered to the resonant network 220 in the portions of the drive signal at the 0V level. Accordingly, the switching network is configured to conduct less power to the resonant network 220 because a second power injection period 465 is a fraction of the first power injection period 460.

In a third switching scenario 430, the first totem pole switching signals 440 (G1, G2) and the second totem pole switching signals 450 (G3, G4) alternate at the switching frequency of the first switching scenario and the second switching scenario but have a phase difference 411 that is non-zero and greater than the phase difference of the second switching scenario. The increased phase difference increases the first overlap period and the second overlap period. Accordingly, the switching network is configured to conduct less power to the resonant network 220 than the second switching scenario 420 because a third power injection period 470 is a smaller fraction of the second power injection period 465 or the first power injection period 460.

The first switching scenario 410, the second switching scenario 420, and the third switching scenario 430 are at the same switching frequency but have difference phase shifts (i.e., phase differences) between the first totem pole switching signals 440 (G1, G2) and the second totem pole switching signals 450 (G3, G4). A gain of the resonant converter can be controlled (e.g., reduced) according to an amount of power delivered to the resonant network. Accordingly, by adjusting the phase difference 411 between the first totem pole switching signals and the second totem pole switching signals, a gain of the resonant converter can be adjusted without affecting the switching frequency. The disclosed resonant converter is configured to clamp the switching frequency at a target value (e.g., maximum value) and there after control the gain of the resonant converter by modulating (e.g., increasing) the phase difference 411.

Figure 5:
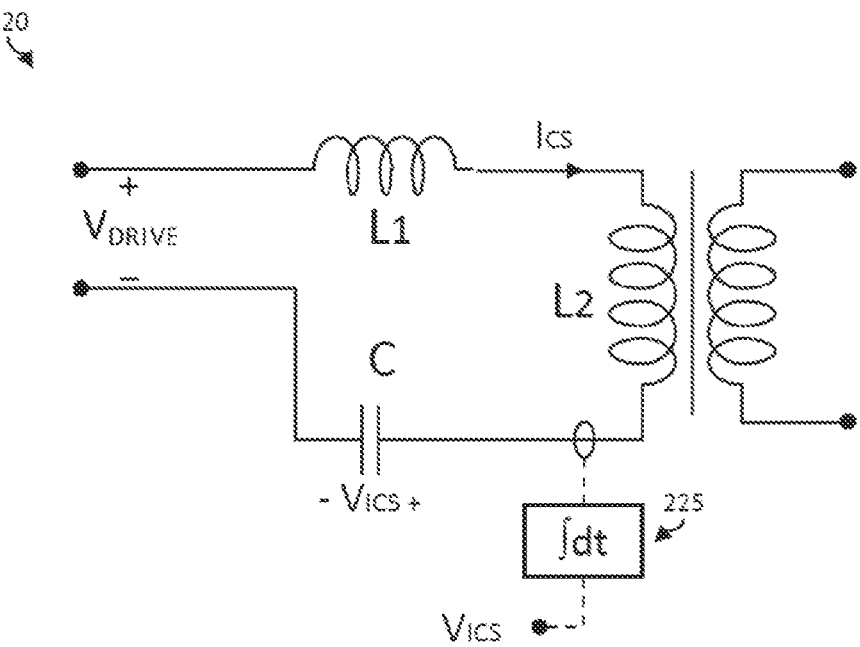
FIG. 5 is a schematic of a resonant network for the resonant converter of FIG. 2 according to a possible implementation of the present disclosure.

The drive signal ($V_{DRIVE}$) generated by the switching network 210 is transmitted to a resonant network 220 of the resonant converter 200. FIG. 5 is a schematic of a possible resonant network for the resonant converter. The resonant network 220 is an inductor-inductor-capacitor resonant network (i.e., LLC resonant network) including two inductive components and a capacitive component (e.g., capacitor). The inductive components include a discrete inductor (e.g., $L_1$) and an inductance (e.g., $L_2$) of a transformer which is included to provide isolation from an input (e.g., HV) side of the resonant converter and an output (e.g. LV) side of the resonant converter. The two inductors and a capacitance (e.g., C) are configured as a series resonant circuit having a current ($I_{CS}$). The resonant network 220 is configured to filter the drive signal ($V_{DRIVE}$) in order to remove higher-order frequency components associated with the square wave shape of the drive signal. Additionally, the resonant network 220 is configured (e.g., by its inductance) to maintain current in the switching network to enable zero-voltage switching (ZVS) of the transistors ($Q_1$, $Q_2$, $Q_3$, $Q_4$), which can conserve power consumption. An output of the resonant network 220 is coupled to a rectifier network 230.

Control of an output of the resonant converter 200 may be achieved by sensing a charge of the resonant network 220 (e.g., charge on the capacitor, C) as feedback. Because charge is related to current through an integration process, creating feedback for the control may include sensing the current ($I_{CS}$) of the resonant network 220 and integrating the current ($I_{CS}$) to obtain the charge of the resonant network. This form of control is known as charge control because it uses charge of the resonant network as feedback.

A charge-control signal ($V_{ICS}$) corresponding to the charge of the resonant network can be generated in a variety of ways. In one possible implementation, the charge control signal ($V_{ICS}$) may be detected as the voltage across the series capacitor (C) of the LLC resonant network. In another possible implementation, the current ($I_{CS}$) of the resonant network may be coupled to an integrator circuit 225 to generate the charge-control signal ($V_{ICS}$). For example, the current ($I_{CS}$) may be coupled, using a transformer (not shown), to a low pass filter, such as an RC filter, to generate the charge-control signal ($V_{ICS}$).

As shown in FIG. 2, the resonant converter 200 utilizes the charge-control signal ($V_{ICS}$) and a load-control signal ($V_{COMP}$) as feedback for a switching controller 240. The switching controller 240 is configured to control the gain of the resonant converter by adjusting the switching signals (G1, G2, G3, G4) to compensate for a changing load condition. The switching frequency of the switching signals (G1, G2, G3, G4) can be adjusted until they reach a maximum frequency (i.e., minimum ON period ($T_{ONMIN}$)) at which point the switching frequency is clamped (i.e. fixed). Any further adjustments to the gain after the switching frequency is clamped are based on a phase difference 411 between the first totem pole switching signals 440 (G1, G2) and the second totem pole switching signals 450 (G3, G4). In other words, the switching controller 240 can generate switching signals to provide control of the gain according to PFM or phase-difference modulation. This handoff between control modes (i.e., PFM, phase-difference modulation) may be based on relative levels of the charge-control signal ($V_{ICS}$) feedback and the load-control signal ($V_{COMP}$).

The load-control signal ($V_{COMP}$) corresponds to a difference between an output voltage ($V_{OUT}$) of the resonant converter and a reference voltage ($V_{REF}$) Accordingly, the resonant converter 200 may include a difference amplifier 235 configured to compare the output voltage ($V_{OUT}$) to the reference voltage ($V_{REF}$) in order to generate the comparison signal ($V_{COMP}$). The switching controller 240 is configured to receive the load-control signal ($V_{COMP}$). A load-control signal ($V_{COMP}$) that is a lower voltage (e.g., approximately zero) may occur during a light load condition when the output voltage ($V_{OUT}$) is approximately equal to the reference voltage ($V_{REF}$) A load-control signal ($V_{COMP}$) that is a higher voltage (e.g., than the lower voltage) may occur during a heavy load condition when the output voltage ($V_{OUT}$) is less than the reference voltage ($V_{REF}$).

The charge-control signal ($V_{ICS}$) can be an oscillating signal that corresponds to the drive signal ($V_{DRIVE}$) of the switching network. For example, the charge-control signal ($V_{ICS}$) may increase while G1, G4 are HIGH and may decrease while G2, G3 are HIGH. The load-control signal ($V_{COMP}$) may change more slowly than the charge-control signal ($V_{ICS}$). Some switching signals may be triggered to change states when the charge-control signal ($V_{ICS}$) equals the load-control signal ($V_{COMP}$). For example, the first totem pole switching signals 440 (G1, G2) may transition (e.g., G1 from HIGH-to-LOW, G2 from LOW-to-HIGH) when $V_{ICS}$ is equal to $V_{COMP}$. Accordingly, a switching frequency of the first totem pole switching signals (G1, G2) may change as load-control signal ($V_{COMP}$) changes (i.e., relative to $V_{ICS}$). The switching signals may also change states based on timing signals received from a timing circuit 250.

Figure 6:
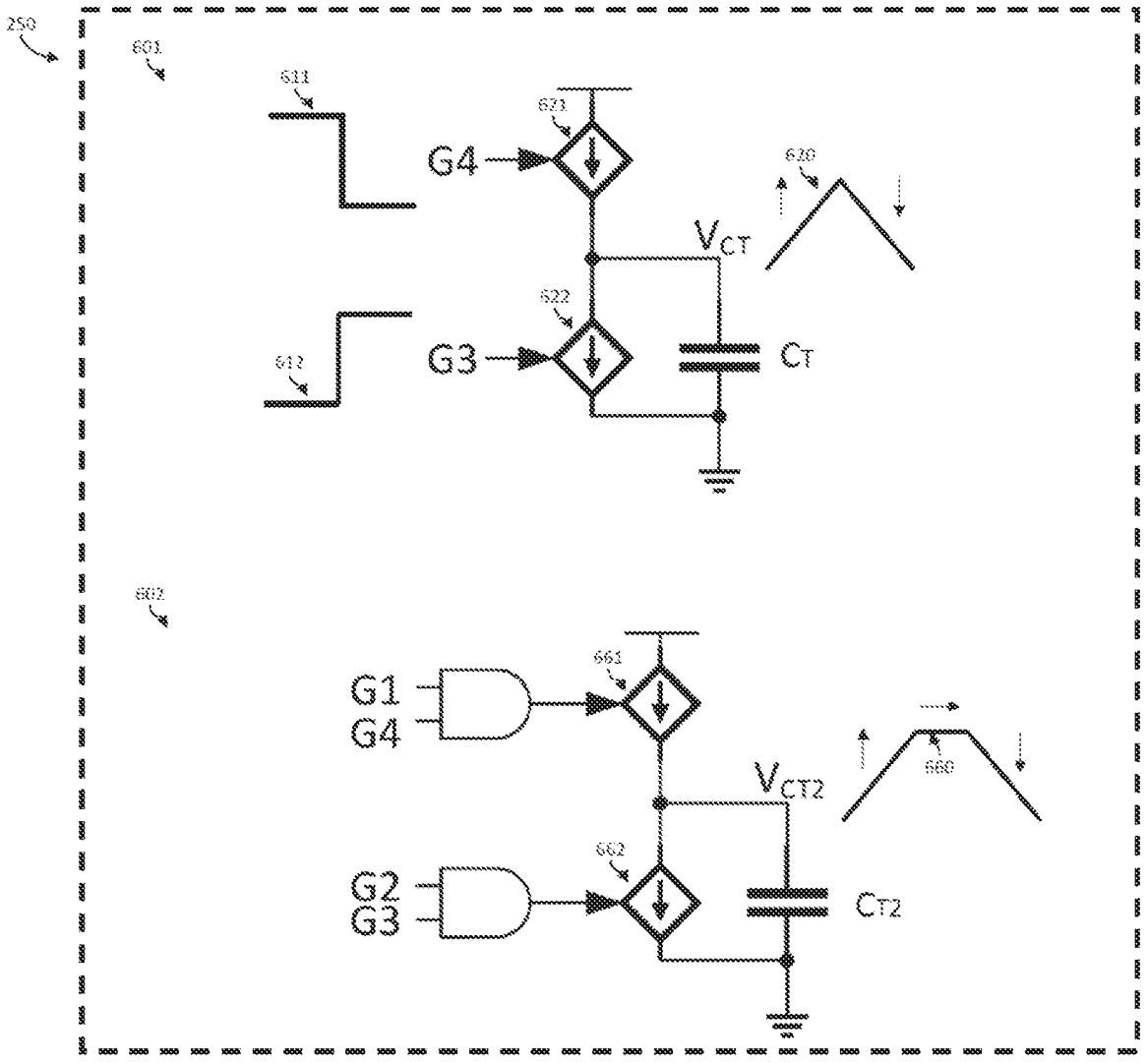
FIG. 6 is a schematic of a timing circuit for the resonant converter of FIG. 2 according to a possible implementation of the present disclosure.

As shown in FIG. 2, the resonant converter 200 can further include a timing circuit 250 configured to generate a first clock-timer signal ($V_{CT}$) and a second clock-timer signal ($V_{CT2}$) based on the switching signals (G1, G2, G3, G4). FIG. 6 is a schematic of a timing circuit 250 for the resonant converter of FIG. 2 according to a possible implementation of the present disclosure. The timing circuit 250 includes a first clock timer 601 and a second clock timer 602.

As shown in FIG. 6, the first clock timer 601 includes a first timer capacitance ($C_T$) that can be charged by current from a charging current source 621 or discharged by current from a discharging current source 622. The charging current source 621 can be controlled ON/OFF by a level of a switching signal 611 and the discharging current source 622 can be controlled ON/OFF by a level of a complementary switching signal 612. For example, the charging current source can be controlled by the G4 switching signal and the discharging current source can be controlled by the G3 switching signal. In other words, the first clock timer 601 can be controlled by the switching signals of the second totem pole circuit 320. Based on the switching signals, the first clock timer 601 is configured to generate a first clock timer signal 620 ($V_{CT}$). The first clock timer signal increases monotonically while G4 is HIGH (G3 is LOW) and decreases monotonically while G3 is HIGH (G4 is LOW). The first clock timer signal 620 can be symmetrical when the charging current source 621 and the discharging current source 622 are equal. This symmetry may be useful for generating complementary switch states that are triggered to change when the first clock timer signal reaches (i.e., is equal) to ground.

The second clock timer 602 includes a second timer capacitance ($C_{T2}$) that can be charged by current from a charging current source 661 or discharged by current from a discharging current source 662 to produce a second clock timer signal 660 ($V_{CT2}$) that increases monotonically while G1 and G4 are HIGH (G2 and G3 LOW) and that decreases monotonically while G3 and G2 are HIGH (G1 and G4 LOW). When neither condition is satisfied the second clock timer signal ($V_{CT2}$) is unchanged (i.e., stable). In other words, the second clock timer signal ($V_{CT2}$) is constant while G1 and G4 are not both HIGH and G2 and G3 not both LOW. The clock timer signals for various gate signal conditions are shown in TABLE 2 along with the drive signal ($V_{DRIVE}$) corresponding to each gate signal condition. From the table, it is shown that the drive signal ($V_{DRIVE}$) is zero while the second clock signal is constant (→). The drive signal ($V_{DRIVE}$) is positive ($+V_{IN}$) while the first clock signal $(V_{CT})$ and the second clock signal $(V_{CT2})$ are increasing ($\uparrow$) and the drive signal $(V_{DRIVE})$ is negative $(-V_{IN})$ while the first clock signal $(V_{CT})$ and the second clock signal $(V_{CT2})$ are decreasing ($\downarrow$).

TABLE 2

CLOCK TIMER AND SWITCHING SIGNALS IN VARIOUS STATES

| STATE | G1 | G2 | G3 | G4 | $V_{CT}$ | $V_{CT2}$ | $V_{DRIVE}$ |
|---|---|---|---|---|---|---|---|
| State_1 | HIGH | LOW | LOW | HIGH | $\uparrow$ | $\uparrow$ | $+V_{IN}$ |
| State_2 | HIGH | LOW | HIGH | LOW | $\downarrow$ | $\rightarrow$ | 0 |
| State_3 | LOW | HIGH | LOW | HIGH | $\uparrow$ | $\rightarrow$ | 0 |
| State_4 | LOW | HIGH | HIGH | LOW | $\downarrow$ | $\downarrow$ | $-V_{IN}$ |

While analog clock timer circuits have been described, it is recognized that other clock timer circuits could be implemented. For example, digital counters that are configured to count up/down could be used in place of the capacitor configured to be charged/discharged and are within the scope of the present disclosure.

The switching controller 240 is further configured to receive a minimum switching period signal $(V_{TONMIN})$. The minimum switching period signal corresponds to the minimum ON period $(T_{ONMIN})$. In other words, the minimum switching period signal can correspond to a maximum switching frequency. Like the reference voltage $(V_{REF})$, the minimum switching period signal $(V_{TONMIN})$ may be factory set by circuitry in the resonant converter 200 (not shown) or configured by external circuitry with levels according to the application.

Figure 7:
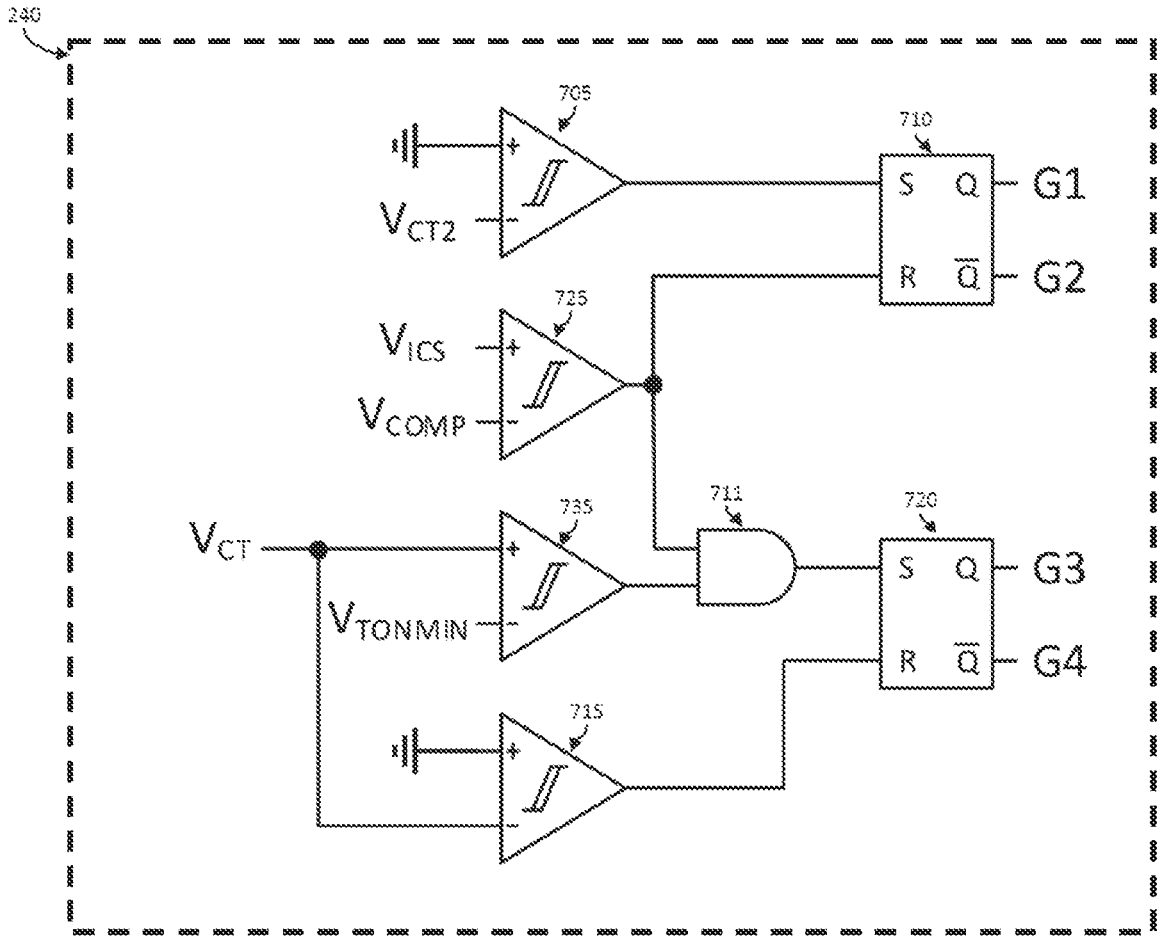
FIG. 7 is a schematic of a switching controller for the resonant converter of FIG. 2 according to a first possible implementation of the present disclosure.

As shown in FIG. 2, the switching controller 240 is configured to receive $V_{ICS}$, $V_{COMP}$, $V_{CT}$, $V_{CT2}$, and $V_{TONMIN}$ and, based on these signals, generate switching signals G1, G2, G3, G4. FIG. 7 is a schematic of a switching controller for the resonant converter of FIG. 2 according to a first possible implementation of the present disclosure. The switching controller 240 can include a first set-reset latch (i.e., first SR latch 710) for controlling the states of the complementary switching signals (G1, G2) for the first totem pole circuit 310 and a second SR latch 720 for controlling the states of the complementary switching signals (G3, G4) for the second totem pole circuit 320. The first SR latch and the second SR latch are controlled by logic and comparators to be in State_1, State_2, State_3, or State 4 of the possible states shown in TABLE 2. In PFM operation the resonant converter toggles between State_1 or State_4 during a switching period. In phase-difference modulation operation, the resonant converter moves through all four states during a switching period. The operation is set automatically by a comparison between the charge control signal $(V_{ICS})$ and the load-control signal $(V_{COMP})$.

Figure 8:
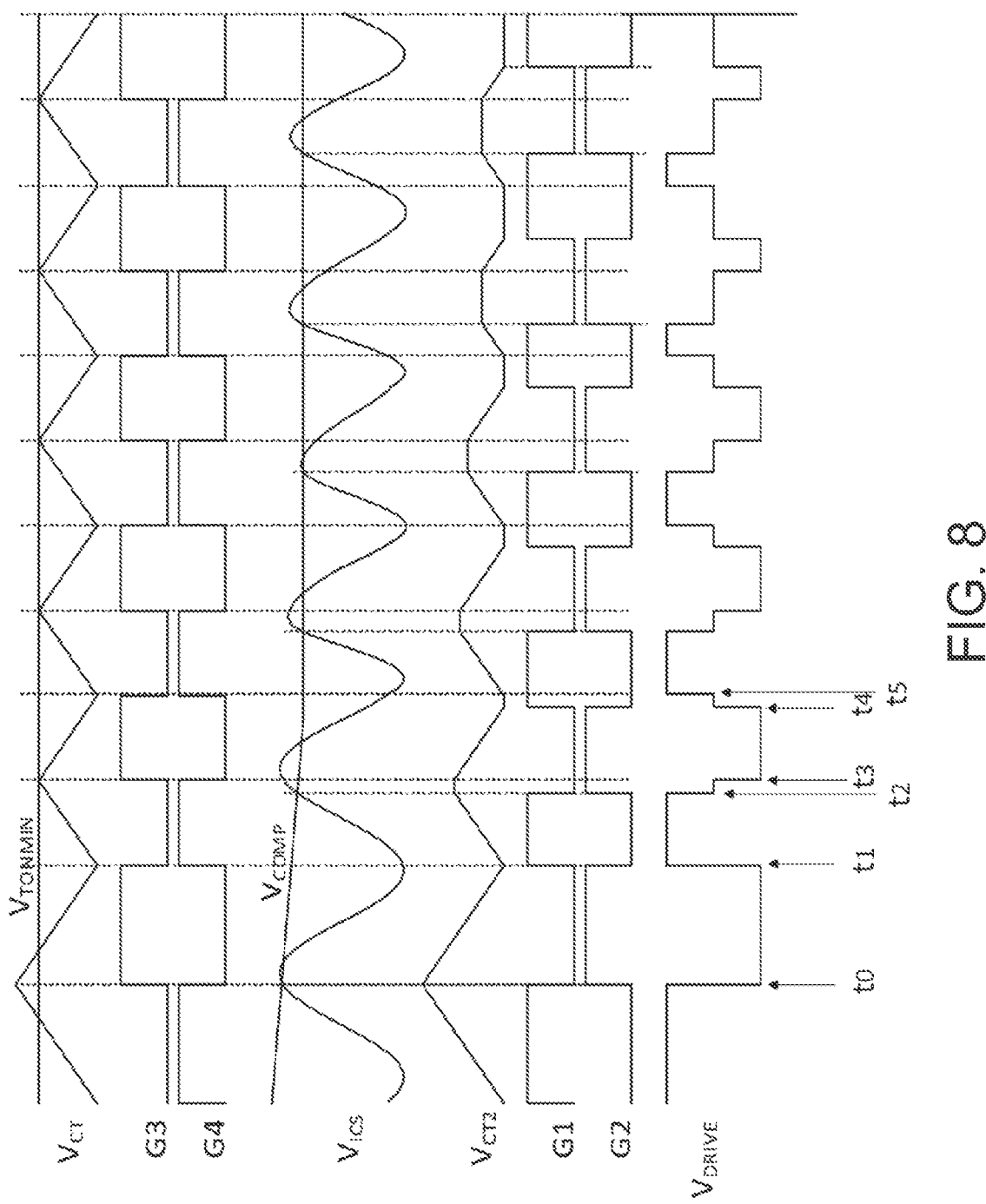
FIG. 8 is a timing diagram of signals of the switching controller of FIG. 7 according to a possible implementation of the present disclosure.

FIG. 8 is a timing diagram showing signals of the resonant converter according to a possible implementation. The signals in this particular implementation will be referred to when describing the operation of the switching controller 240 shown in FIG. 7. The signals are an example and are not limiting to the disclosure.

As shown in FIG. 7, the switching controller 240 includes a first comparator 705 that is configured to set the first SR latch 710 (i.e., G1=HIGH, G2=LOW) when the second clock-timer signal $(V_{CT2})$ reaches zero (i.e., ground). The switching controller 240 further includes a second comparator 715 that is configured to reset the second SR latch 720 (i.e., G4=HIGH, G3=LOW) when the first clock-timer signal $(V_{CT})$ reaches zero (i.e., ground).

As shown in FIG. 8, at a first time $(t_1)$ $V_{CT}$ and $V_{CT2}$ have reached ground (i.e., 0). Accordingly, the first SR latch 710 is set (i.e., G1=HIGH, G2=LOW) and the second SR latch 720 is reset (i.e., G3=LOW, G4=HIGH) so that the resonant converter enters State_1 of TABLE 2. In State_1, the first clock-timer signal $(V_{CT})$ and the second clock-timer signal $(V_{CT2})$ begin to increase (see FIG. 6). Also in State_1, the drive signal $(V_{DRIVE})$ is set to $+V_{IN}$ (see FIG. 3) and the charge control signal $(V_{ICS})$ begins to increase.

As shown in FIG. 7, the switching controller 240 further includes a third comparator 725 that is configured to reset the first SR latch 710 (i.e., G1=LOW, G2=HIGH) when $V_{ICS}$ equals $V_{COMP}$. The relationship between the charge-control signal $(V_{ICS})$ and the load control signal $(V_{COMP})$ help to set a phase difference between the switching signals (G1, G2) for the first totem pole circuit 310 and the switching signals (G3, G4) for the second totem pole circuit 320. For example, when $V_{COMP}$ is higher (i.e., heavy load condition) then an increasing $V_{ICS}$ takes more time to reach $V_{COMP}$ (i.e., equal $V_{COMP}$) than when $V_{COMP}$ is lower (i.e., light load condition). As a result, switching frequencies may be lower than a maximum switching frequency in a heavy load condition (i.e., $V_{OUT}<V_{REF}$) but may reach the maximum switching frequency as the load condition is made lighter.

As shown in FIG. 8, at a second time $(t_2)$ $V_{ICS}$ has increased to the level of $V_{COMP}$ so that the third comparator 725 resets first SR latch 710 (i.e., G1=LOW, G2=HIGH). The second SR latch 720 remains reset (i.e., G3=LOW, G4=HIGH), however, because all criteria for setting the second SR latch 720 have not been satisfied. Accordingly, at the second time $(t_2)$ the resonant converter enters State_3 of TABLE 2. In State_3, the first clock timer signal $(V_{CT})$ continues to increase (see FIG. 6) but the second clock timer signal $(V_{CT2})$ stops increasing (see FIG. 6). Further, the drive signal $(V_{DRIVE})$ is zero and the charge control signal $(V_{ICS})$ continues to increase.

As shown in FIG. 7, the switching controller 240 further includes an AND gate 711 configured to set the second SR latch 720 when two criteria are satisfied. The first criterion (i.e., charge-control signal criterion) is $V_{ICS}$ reaching $V_{COMP}$ (i.e., $V_{ICS}\geq V_{COMP}$) and has been discussed. The second criterion is $V_{CT}$ reaching $V_{TONMIN}$ (i.e., $V_{CT}=V_{TONMIN}$) Accordingly, the switching controller includes a fourth comparator 735 configured to compare the first clock-timer signal $(V_{CT})$ to the minimum switching period signal $(V_{TONMIN})$ The second SR latch 720 is set when both (i) $V_{ICS}$ has reached (or exceeded) $V_{COMP}$ and (ii) $V_{CT}$ has reached (or exceeded) $V_{TONMIN}$.

As shown in FIG. 8, at a third time $(t_3)$, $V_{CT}$ has reached $V_{TONMIN}$ (i.e., $V_{CT}=V_{TONMIN}$) while $V_{ICS}$ exceeds $V_{COMP}$. As a result, the AND gate 711 is configured to set the second SR latch 720 (i.e., G3=HIGH, G4=LOW) and the resonant converter enters State_4 of TABLE 2. In State_4, the first clock timer signal $(V_{CT})$ and the second clock timer signal $(V_{CT2})$ begin to decrease (see FIG. 6). Further, the drive signal $(V_{DRIVE})$ is negative (e.g., $-V_{IN}$) and the charge control signal $(V_{ICS})$ begins to decrease.

As shown in FIG. 6, when a clock timer changes state the charge stored in the capacitor is discharged. For example, $C_T$ of first clock timer 601 is charged by the charging current source 621 while G4 is HIGH and G3 is LOW and discharged by the discharging current source 622 while G4 is LOW and G3 is HIGH. When charging current source 621 and discharging current source 622 are equal then a period to charge the first timer capacitance $(C_T)$ equals a period to discharge the first timer capacitance $(C_T)$. This symmetry of the charging period and discharging period is true for the first clock timer signal 620 and the second clock timer signal 660. A phase shift (i.e., phase difference) between the clock signals is generated when the second clock timer 602 is held in neither a charging nor a discharging state. Accordingly, a phase difference is generated between the timing while the resonant converter is in State_2 or State_3.

As shown in FIG. 8, at a fourth time ($t_4$), $V_{CT2}$ has reached ground. As a result, the first SR latch 710 is set (i.e., G1=HIGH, G2=LOW). Due to the phase difference between $V_{CT2}$ and $V_{CT}$, however, the second SR latch 720 remains set (i.e., G3=HIGH, G4=LOW). As a result, the resonant converter enters the State_2 of TABLE 2. In State_2, the first clock timer signal ($V_{CT}$) continues to decrease while the second clock timer signal ($V_{CT2}$) remains at ground. Further, the drive signal ($V_{DRIVE}$) is zero and the charge control signal ($V_{ICS}$) continues to decrease.

As shown in FIG. 8, at a fifth time ($t_5$), $V_{CT}$ has reached ground (i.e., $V_{CT}=0$). As a result, the second SR latch 720 is reset (i.e., G3=LOW, G4=HIGH) while the first SR latch 710 remains set (i.e., G1=HIGH, G2=LOW). As a result, the resonant converter enters the State_1 of TABLE 2. In State_1, the first clock timer signal ($V_{CT}$) and the second clock timer signal ($V_{CT2}$) begin to increase. Further, the drive signal ($V_{DRIVE}$) is set to positive (+$V_{IN}$) and the charge control signal ($V_{ICS}$) begins to increase. At the fifth time ($t_5$) the switching cycle of the resonant converter begins to repeat and can be explained as described above. It should be noted, the resonant converter is configured for phase-difference modulation times at time t1, t2, t3, t4, and t5 because $V_{ICS}$ reaches $v_{COMP}$ before $V_{CT}$ reaches $V_{TONMIN}$. At a zeroth time ($t_0$), $V_{CT}$ reaches $V_{TONMIN}$ before $V_{ICS}$ reaches $V_{COMP}$. Accordingly, the resonant converter is configured for PFM modulation at time $t_0$. As can be observed, the resonant converter is configured to automatically and continuously (i.e., without dedicated mode switching) change between modes of control and limit the maximum switching frequency.

Figure 9:
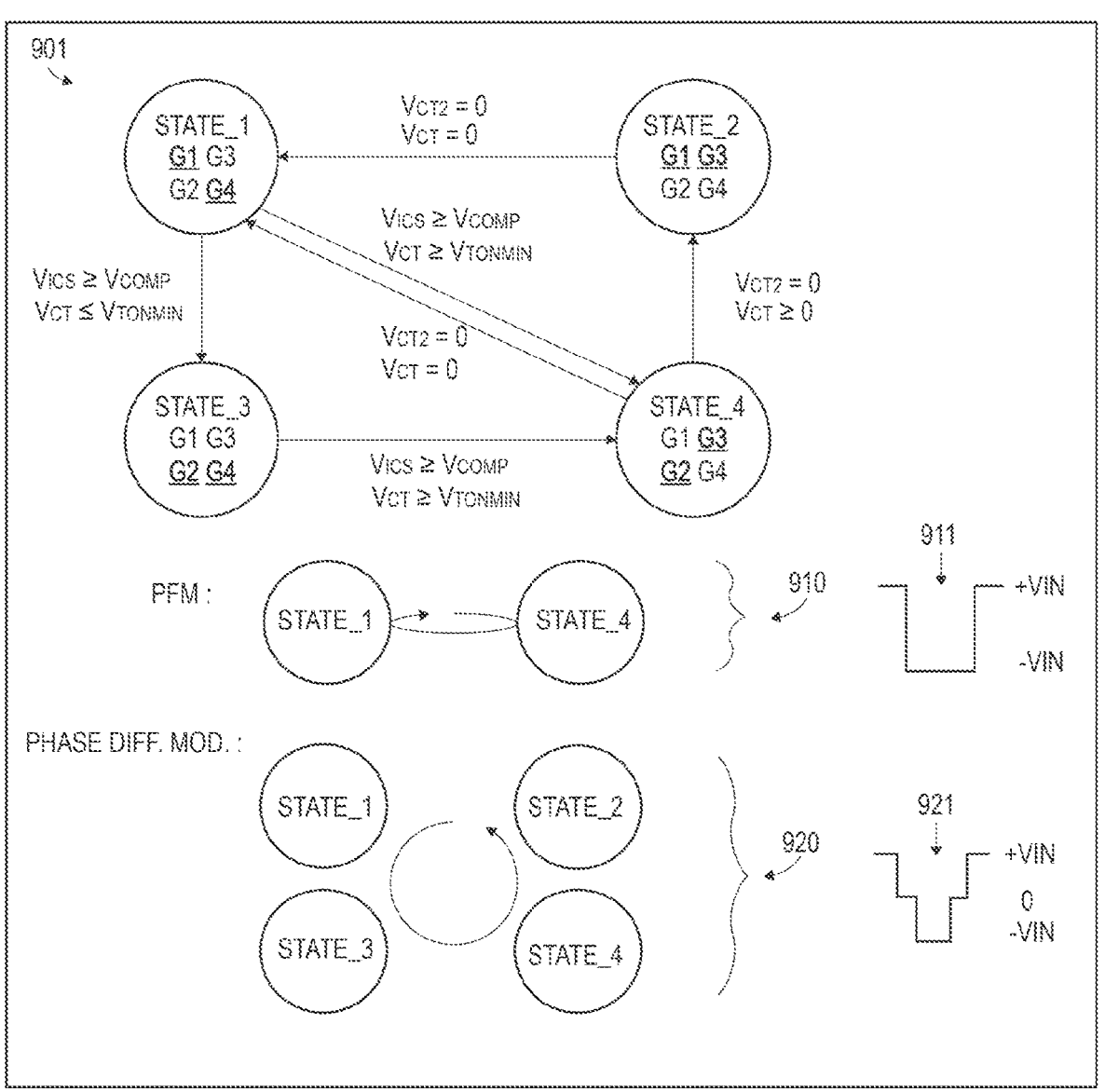
FIG. 9 is a state diagram of the resonant converter according to a possible implementation of the present disclosure.

FIG. 9 is a state diagram of the resonant converter according to a possible implementation of the present disclosure. The state diagram 901 illustrates the states listed in TABLE 2 and the criteria required to move between states. In a first mode, the resonant converter may alternate between STATE_1 and STATE_4, as shown in a first inset 910. In the first mode, the drive signal ($V_{DRIVE}$) is a two-level square wave 911 and the resonant converter is controlled to regulate the output voltage using PFM. In a second mode, the resonant converter cycles through STATE_1, STATE_3, STATE 4, and STATE_2 as shown in the second inset 920. In the second mode, the drive signal ($V_{DRIVE}$) is a three-level square wave 921 and the resonant converter is controlled to regulate the output voltage using phase-difference modulation. The mode is set by the criteria and the signal levels which can change to adapt to various load conditions in real time.

Figure 10:
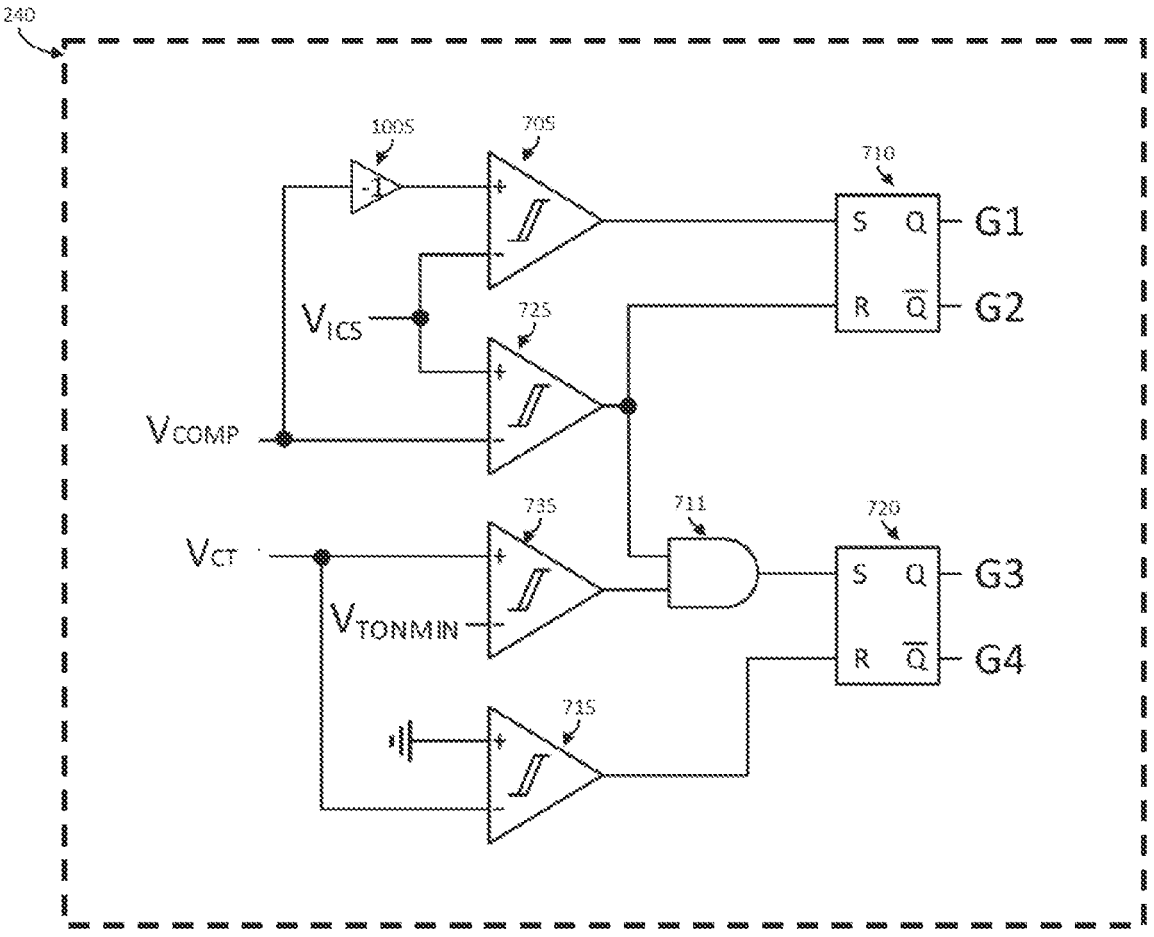
FIG. 10 is a schematic of a switching controller for the resonant converter of FIG. 2 according to a second possible implementation of the present disclosure.

Variations of the switching controller 240, as shown in FIG. 7, may exist. For example, FIG. 10 illustrates one such variation. FIG. 10 is a schematic of a switching controller for the resonant converter of FIG. 2 according to an alternate implementation. The switching controller 240 includes the first SR latch 710 and the second SR latch 720 controlled by the first comparator 705, second comparator 715, third comparator 725, fourth comparator 735, and gate 711 as before. The variation lies in the comparison at first comparator 705. The switching controller shown in FIG. 9 includes an inverter 1005 configured to create an inverted (i.e., negative) version of the load-control signal (i.e., $-V_{COMP}$). This signal ($-V_{COMP}$) is used in place of the second clock-timer signal $V_{CT2}$ for determining the set transition of the first SR latch 710. In other words, instead of using a clock timer to determine the period necessary for $V_{ICS}$ increases to reach $V_{COMP}$ and simply minoring this period, the implementation of FIG. 9 determines when $V_{ICS}$ decreases to reach $-V_{COMP}$. This implementation may have the advantage of accuracy because it can account for changes in the $V_{COMP}$ signal between the reset and the set of first SR latch 710.

Figure 11:
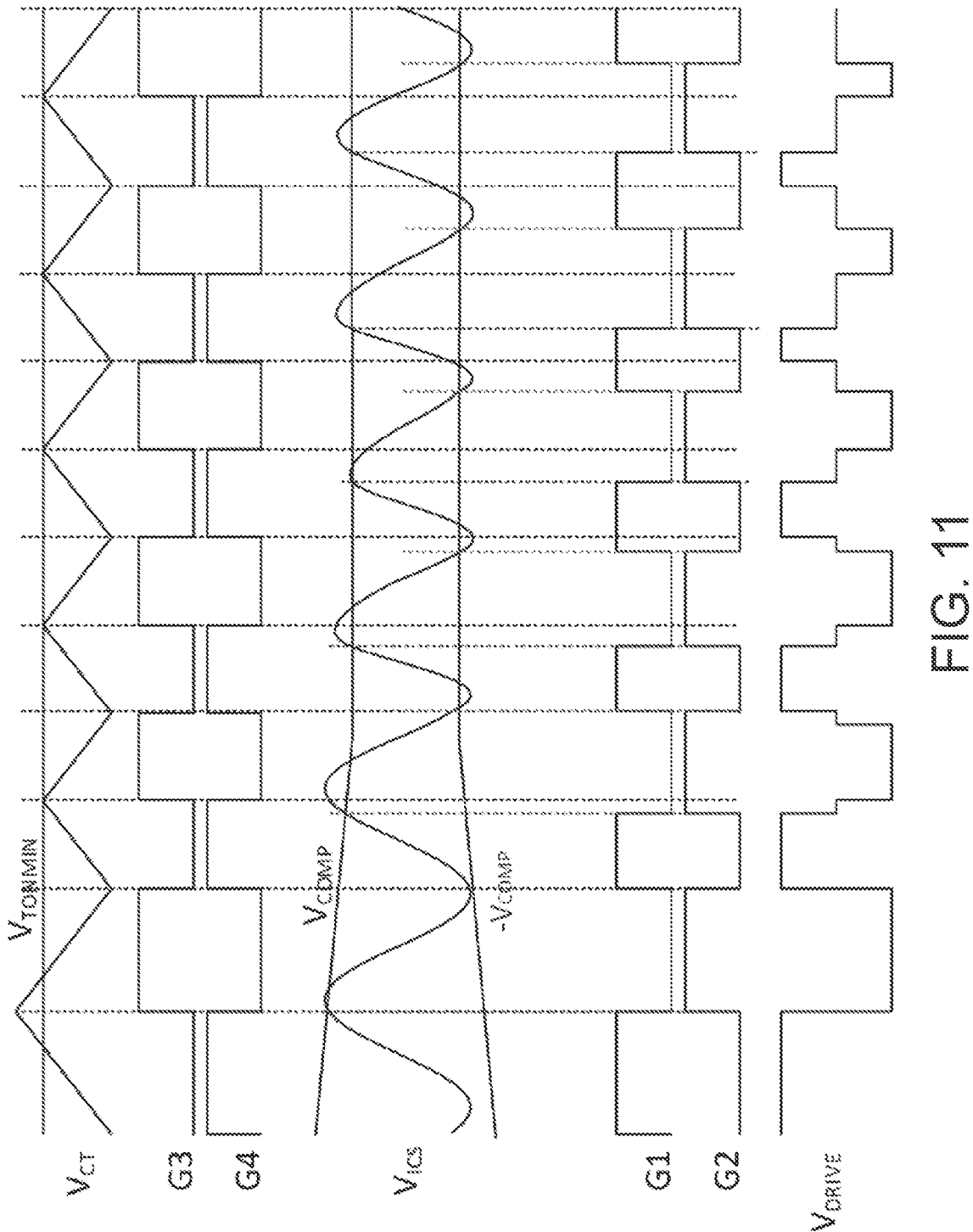
FIG. 11 is a timing diagram of signals of the switching controller of FIG. 10 according to a possible implementation of the present disclosure.

FIG. 11 is a timing diagram of signals of the switching controller of FIG. 10 according to a possible implementation of the present disclosure. As shown, only the second clock-timer signal is replaced with a $-V_{COMP}$ signal. A charge-control signal criterion for changing states of the first SR-latch is (i) a charge-control signal ($V_{ICS}$) greater than or equal to a load-control signal ($V_{COMP}$) when the charge-control signal is increasing and (ii) the charge-control signal less than or equal to a negative load-control signal ($-V_{COMP}$) when the charge-control signal is decreasing. Assuming the charge-control signal criterion is satisfied, a first clock-timer signal criterion for changing states of the second SR-latch (i.e., G1, G2) is a first clock-timer signal greater than or equal to a minimum switching period signal when the first clock-timer signal is increasing. The first clock-timer signal criterion for changing states of the second SR-latch (i.e. G3, G4) is the first clock-timer signal less than or equal to zero (i.e. ground).

Figure 12:
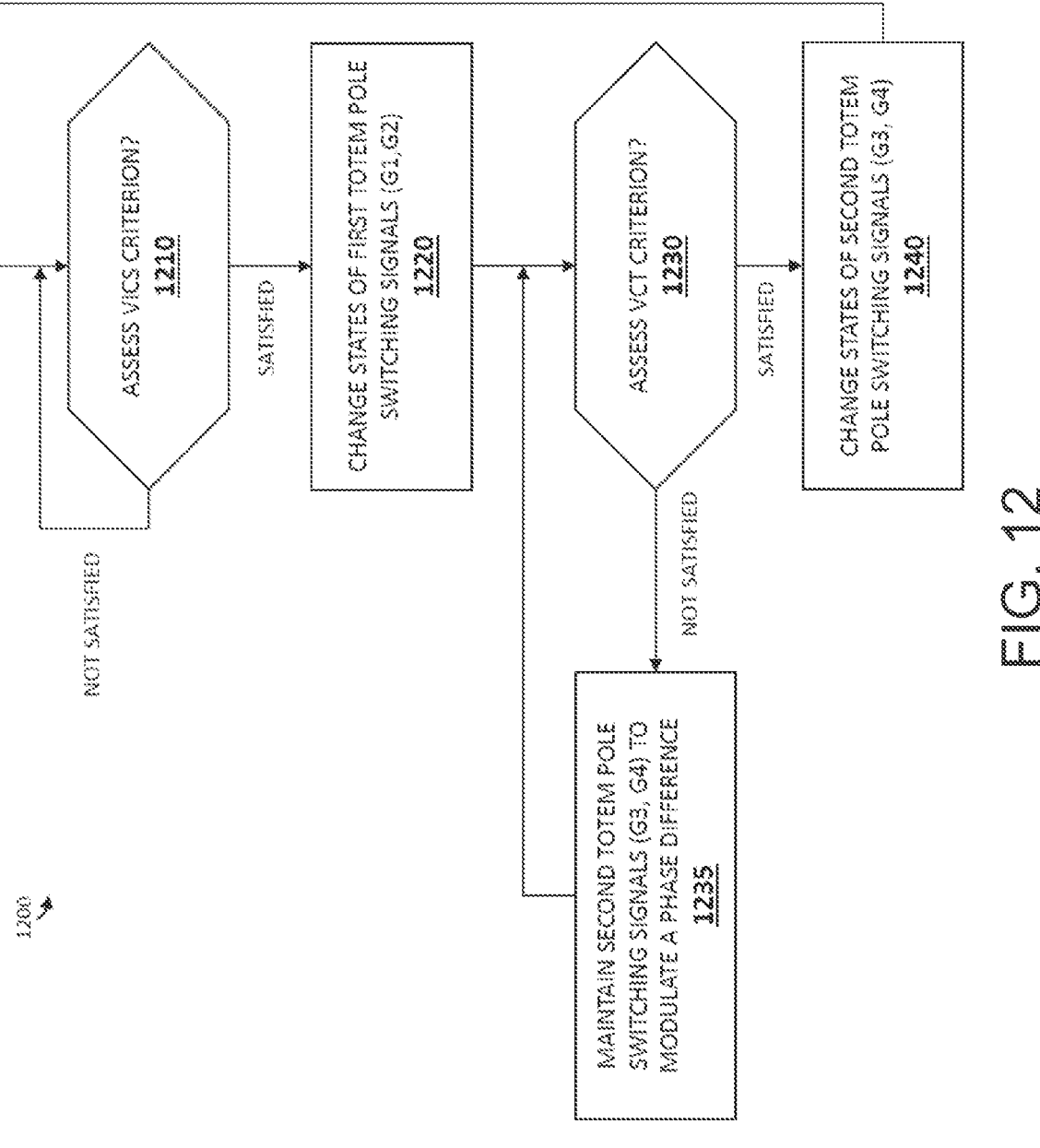
FIG. 12 is a method for controlling the switching of a full bridge switching network of a resonant converter according to a possible implementation of the present disclosure.

FIG. 12 is a method for controlling the switching of a full bridge switching network of a resonant converter. The method 1200 can be applied to a switching controller, such as shown in FIG. 10. The method includes assessing 1210 a charge-control signal criterion (i.e., $V_{ICS}$ criterion). For example, when $V_{ICS}$ is rising the $V_{ICS}$ criterion may be $V_{ICS}$ is greater than or equal to $V_{COMP}$ and when $V_{ICS}$ is decreasing, the charge control criterion may be $V_{ICS}$ is less than or equal to $-V_{COMP}$. If $V_{ICS}$ satisfies the $V_{ICS}$ criterion, then the method includes changing 1220 states of switching signals (G1, G2) for the first totem pole circuit of the full bridge switching network are changed. For example, if G1=HIGH and G2=LOW then changing states generates G1=LOW and G2=HIGH. Otherwise, the method includes repeating the assessment until the $V_{ICS}$ criterion is satisfied.

The method 1200 then includes assessing 1230 a first clock-timer signal criterion (i.e., $V_{CT}$ criterion). For example, when the first clock-timer signal ($V_{CT}$) is increasing, then the clock timer criterion may be $V_{CT}$ greater than or equal to $V_{TONMIN}$ and when $V_{CT}$ is decreasing, then the clock timer criterion may be $V_{CT}$ less than or equal to ground (i.e., 0 volts). If $V_{CT}$ satisfies the clock timer signal criterion (and satisfies the $V_{ICS}$ criterion), then the method includes changing 1240 states of switching signals (G3, G4) for the second totem pole circuit of the full bridge switching network. For example, if G3=LOW and G4=HIGH then changing states generates G3=HIGH and G4=LOW. Otherwise, the method 1200 includes maintaining 1235 states of the switching signals (G3, G4) for the second totem pole circuit (i.e., until $V_{CT}$ satisfies the $V_{CT}$ criterion) to modulate a phase difference between the switching signals (G1, G2) for the first totem pole circuit and the switching signals (G3, G4) for the second totem pole circuit. In other words, the maintaining states of the second totem pole switching signals until both the charge-control signal criterion and the first clock-timer signal criterion are satisfied results in a phase shift (i.e., phase difference) between the first totem pole switching signals and the second totem pole switching signals when the charge-control signal criterion is satisfied before the first clock timer criterion is satisfied. Alternatively, maintaining states of the second totem pole switching signals until both the charge-control signal criterion and the first clock-timer signal criterion are satisfied results in no phase shift (i.e., no phase difference) between the first totem pole switching signals and the second totem pole switching signals when the charge-control signal criterion is satisfied after the first clock timer criterion is satisfied. The method 1200 can be repeated to switch the full bridge switching network of a resonant converter as conditions change.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method for controlling switching of a full bridge switching network of a resonant converter, the method including:

assessing a charge-control signal criterion that is satisfied when a charge-control signal is greater than or equal to a load-control signal;

changing states of first totem pole switching signals for the full bridge switching network when the charge-control signal criterion is satisfied;

assessing a first clock-timer signal criterion that is satisfied when a first clock-timer signal is greater than or equal to a minimum switching period signal; and maintaining states of second totem pole switching signals for the full bridge switching network until both the charge-control signal criterion and the first clock-timer signal criterion are satisfied, thereby clamping a switching frequency of the first totem pole switching signals and the second totem pole switching signals at a target frequency defined by the minimum switching period signal.

2. The method according to claim 1, wherein maintaining states of the second totem pole switching signals for the full bridge switching network until both the charge-control signal criterion and the first clock-timer signal criterion are satisfied results in a phase difference between the first totem pole switching signals and the second totem pole switching signals when the charge-control signal criterion is satisfied before the first clock-timer signal criterion is satisfied.

3. The method according to claim 2, wherein the phase difference reduces a power injection period of the full bridge switching network.

4. The method according to claim 2, wherein maintaining states of the second totem pole switching signals for the full bridge switching network until both the charge-control signal criterion and the first clock-timer signal criterion are satisfied results in no phase difference between the first totem pole switching signals and the second totem pole switching signals when the charge-control signal criterion is satisfied after the first clock-timer signal criterion is satisfied.

5. A method for controlling switching of a switching network of a resonant converter, the method including:

generating a charge-control signal corresponding to a charge of a resonant network of the resonant converter;

generating a load-control signal based on a voltage reference and an output from a rectifier network of the resonant converter;

providing the charge-control signal and the load-control signal as feedback to a switching controller of the resonant converter; and providing switching signals from the switching controller to a first totem pole circuit and a second totem pole circuit of the resonant converter based on a control mode of the resonant converter, wherein the control mode includes:

assessing a charge-control signal criterion that is satisfied when the charge-control signal is greater than or equal to the load-control signal;

changing states of the switching signals for the first totem pole circuit when the charge-control signal criterion is satisfied;

assessing a first clock-timer signal criterion that is satisfied when a first clock-timer signal is greater than or equal to a minimum switching period signal; and maintaining states of the switching signals for the second totem pole circuit until both the charge-control signal criterion and the first clock-timer signal criterion are satisfied, thereby clamping a switching frequency of the switching signals at a target frequency defined by the minimum switching period signal.

6. The method of claim 5, wherein generating the charge-control signal comprises:

generating the charge-control signal by sensing a current of the resonant network;

integrating the current to obtain the charge; and providing the charge as a charge-control feedback signal to the switching controller.

7. The method of claim 6, wherein generating the charge-control signal is performed while the resonant network is coupled to an integrator circuit.

8. The method of claim 5, wherein the resonant network comprises an LLC resonant network, and wherein generating the charge-control signal comprises:

detecting a voltage across a series capacitor of the LLC resonant network.

9. A non-transitory computer-readable medium storing instructions which, when executed by a processor, cause the processor to perform a method for controlling switching of a full bridge switching network of a resonant converter, the method including:

assessing a charge-control signal criterion that is satisfied when a charge-control signal is greater than or equal to a load-control signal;

changing states of first totem pole switching signals for the full bridge switching network when the charge-control signal criterion is satisfied;

assessing a first clock-timer signal criterion, wherein the first clock-timer signal criterion is satisfied when a first clock-timer signal is greater than or equal to a minimum switching period signal; and maintaining states of second totem pole switching signals for the full bridge switching network until both the charge-control signal criterion and the first clock-timer signal criterion are satisfied, thereby clamping a switching frequency of the first totem pole switching signals and the second totem pole switching signals at a target frequency defined by the minimum switching period signal.

10. The non-transitory computer-readable medium of claim 9, wherein maintaining the states comprises modulating a phase difference between the first totem pole switching signals and the second totem pole switching signals, after clamping the switching frequency.

11. The non-transitory computer-readable medium of claim 10, wherein the phase difference reduces a power injection period of the full bridge switching network.

* * * * *